United States Patent
Lynch

(10) Patent No.: US 9,362,733 B2
(45) Date of Patent: *Jun. 7, 2016

(54) INSULATOR COVER FOR ELECTRICAL DISTRIBUTION SYSTEMS

(71) Applicant: Eco Electrical Systems, Reno, NV (US)

(72) Inventor: Michael Lynch, Reno, NV (US)

(73) Assignee: Eco Electrical Systems, Reno, NV (US)

( * ) Notice: Subject to any disclaimer, the term of this patent is extended or adjusted under 35 U.S.C. 154(b) by 206 days.

This patent is subject to a terminal disclaimer.

(21) Appl. No.: 14/066,427

(22) Filed: Oct. 29, 2013

(65) Prior Publication Data
US 2015/0114678 A1 Apr. 30, 2015

(51) Int. Cl.
*H02G 3/08* (2006.01)
*H02G 7/00* (2006.01)

(52) U.S. Cl.
CPC .............. *H02G 7/00* (2013.01); *Y10T 29/49227* (2015.01)

(58) Field of Classification Search
CPC ................................. H02G 3/081; H01B 17/22
USPC .......................................... 174/66, 5 SB, 154
See application file for complete search history.

(56) References Cited

U.S. PATENT DOCUMENTS

| | | | | |
|---|---|---|---|---|
| 1,221,894 A | * | 4/1917 | Neeley | H01B 17/22 174/169 |
| 1,239,902 A | * | 9/1917 | Goddard | H01B 17/16 174/186 |
| 2,311,486 A | * | 2/1943 | Swearingen | H01B 17/22 174/172 |
| 3,639,681 A | * | 2/1972 | Ettlinger | H01B 17/56 174/138 F |
| 4,810,837 A | * | 3/1989 | Giroux | H01B 17/22 174/172 |
| 7,154,034 B2 | * | 12/2006 | Lynch | H01H 31/006 174/138 E |
| 7,154,036 B2 | * | 12/2006 | Lynch | H02G 7/00 174/138 F |
| 7,297,869 B2 | * | 11/2007 | Hiller | H01B 17/00 119/174 |
| 7,301,096 B2 | * | 11/2007 | Strong | H01B 17/00 174/5 R |
| 7,671,274 B2 | * | 3/2010 | An | H01B 17/16 174/135 |
| 8,957,314 B2 | * | 2/2015 | Niles | H02G 7/00 174/138 F |

* cited by examiner

*Primary Examiner* — William H Mayo, III
*Assistant Examiner* — Hiram E Gonzalez
(74) *Attorney, Agent, or Firm* — Patent Law Group LLP; Brian D. Ogonowsky

(57) ABSTRACT

A dielectric cover system for an insulator supporting a high voltage conductor is molded to fit over the insulator to cover at least a top portion of the insulator and the conductor in contact with the insulator. A bolt through the cover is inserted to a depth to engage a reduced-diameter neck area of the insulator to prevent the cover from being rotated about the insulator during a high wind condition. Other securing devices may instead be used that allow the cover to be freely placed over the insulator and then effectively restrict an inner diameter of the cover at a reduced diameter portion of the insulator, such that the securing device blocks the cover from being lifted off the insulator and rotated about the insulator.

16 Claims, 4 Drawing Sheets

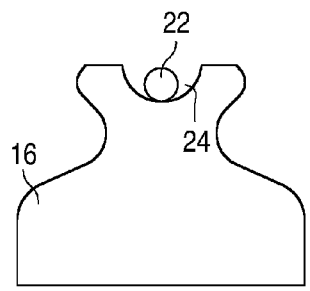
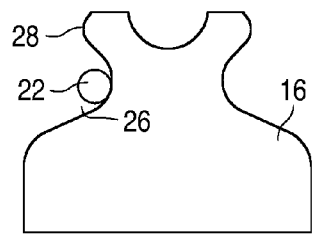
FIG. 3
(PRIOR ART)
FIG. 4
(PRIOR ART)
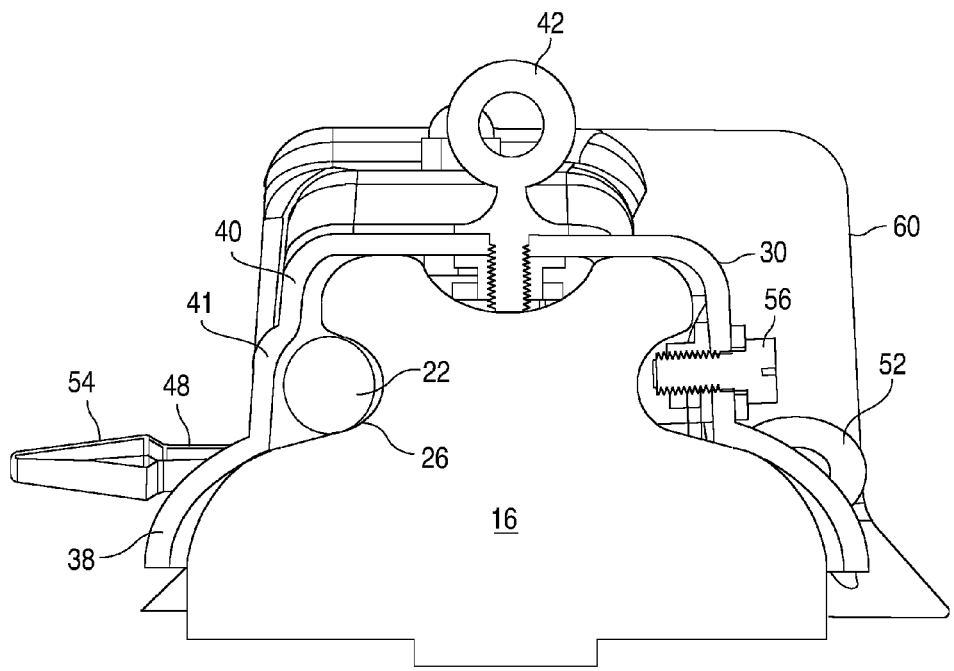
FIG. 6

INSULATOR COVER FOR ELECTRICAL DISTRIBUTION SYSTEMS

FIELD OF THE INVENTION

This invention relates to an insulating cover system for high voltage power line insulators and, in particular, to a cover system that is adapted to prevent the cover from tilting due to high winds while covering the insulator.

BACKGROUND

High voltage (HV) electrical distribution systems typically use utility poles or towers that support insulators, such as ceramic insulators, and the insulators support conductors that carry the high voltage. A wooden pole is provided as an example in FIGS. 1 and 2, but the structure may instead be a large steel tower for higher voltage transmission.

FIG. 1 is a side view of a top portion of a wooden pole 10, looking into the ends of two horizontal crossarms 12 and 14. FIG. 2 is a top down view of the pole 10 of FIG. 1 showing four sets of insulators supporting four conductors. The crossarms 12 and 14 are typically wood, but materials other than wood are also used for crossarms. In another example, the pole 10 may support only a single insulator and conductor.

Ceramic insulators 16 and 18 are affixed to the crossarms 12 and 14 by bolts 20. A conductor 22 (typically twisted wire strands) seats in a groove in the insulators 16/18 or in some other securing feature, such as a metal vice or other clamp at the top. The conductor 22 is frequently affixed over the top of each insulator 16/18 or to the side of the insulator 16/18 via a metal tie wire.

FIG. 3 illustrates the conductor 22 seated in a top groove 24 of the insulator 16, and FIG. 4 illustrates the conductor 22 seated in the neck 26 of the insulator 16 below the ear 28. The wire tie is not shown.

The crossarms 12/14 in FIG. 2 are shown supporting additional sets of insulators supporting additional conductors for 3-phase voltages. The invention is applicable to all types of insulator configurations.

Dielectric insulator covers, which also cover a portion of the conductor 22, are frequently used for the protection of wildlife and preventing outages, permanent or momentary. The insulator/conductor covers are typically required to be 72 inches in length according to the Suggested Practices Guide developed by the Avian Power Line Interaction Committee (APLIC). Insulator/conductor covers measure 36 inches in one direction from the center of the insulator and 36 inches in the other direction. To obtain this 72 inch coverage, manufacturers have been designing these covers in three separate parts: the insulator cover, one extension arm connectable to one side of the insulator cover, and a second extension arm connectable to the other side of the insulator cover.

Prior art insulator covers for covering the insulators 16 and 18 in FIGS. 1-4 are typically designed for the symmetrical insulator/wire configuration of FIG. 3, where the conductor 22 is tied to the top of the insulator 16. If a prior art cover were used with the asymmetrical configuration of FIG. 4, the cover would seat at an angle over the insulator 16. The cover is somewhat larger than the insulator, so there is some play between the cover and insulator.

Additionally, different conductor diameters may be used with the same type of insulator, where the diameter may be selected based on the required voltage or current transmitted or the distance between poles 10. This further creates unpredictability in the insulator cover's ability to be properly oriented with respect to the insulator and conductor.

In either the symmetrical or asymmetrical case, the prior art covers are not strongly secured to the insulator 16 and conductor 22, and a high wind may catch the open underside of the cover and rotate it with respect to the insulator 16 and conductor 22, reducing the effectiveness of the cover in protecting wildlife and preventing shorts. If a rotated or tilted cover is spotted, a lineman must reorient the cover. The problem with tiled covers is more extreme when the conductor is tied to the side of the insulator, as shown in FIG. 4. In FIG. 4, the rotation point of the cover may be around the off-centered conductor, so the cover more easily lifts off from the opposite side. This exact problem with prior art insulator covers has been reported to the present inventor by a power company, and the inventor was asked to design an improved insulator/conductor cover that did not rotate with high winds.

Therefore, what is needed is a practical cover system for an insulator/conductor that can accommodate symmetrical and asymmetrical insulator/conductor configurations and which cannot be rotated or even tilted when subjected to high winds.

SUMMARY

A semi-rigid insulator cover, in accordance with one embodiment of the present invention, has a shape that can accommodate both symmetrical and asymmetrical insulator/conductor configurations while being in the same proper orientation. In one embodiment, the insulator cover has a securing device that asymmetrically reduces the inner diameter of the cover at the narrowed neck area of the insulator to prevent the cover from being lifted or rotated with respect to the insulator. If the securing device is rigid, the cover is placed over the insulator while being tilted to cause the securing device to enter the narrow neck area of the insulator. Then the cover is un-tilted to assume the proper position over the insulator while the securing device becomes further inserted within the narrowed neck area of the insulator.

The lineman then inserts a pin through holes in the cover that extend just below the conductor. The pin therefore blocks the cover from being lifted off the insulator. In one embodiment, there are two sets of the holes on either side of the insulator.

Since the cover is now restricted by both the pins and the securing device, it can neither be lifted off the insulator nor rotated about the insulator.

In an embodiment where the conductor is tied to the side of the neck, the securing device is located on the side of the cover opposite to where the conductor is located. The pin under the off-centered conductor blocks rotation of the cover in one direction, and the securing device blocks rotation in the other direction.

The invention also allows the cover to be used when the conductor is tied to the top of the insulator. An additional set of holes for the pins may be located just below the conductor to limit the upward movement of the cover after installation. Since the rotation point of the cover is now higher and centered, the rotation is primarily blocked by the lower walls of the cover contacting the sides of the insulator. If the pins are sufficiently close to the centered conductor, the securing device may not be needed to prevent rotation but does not hamper the installation of the cover.

In one embodiment, the securing device is a plastic bolt that extends through a hole in the side of the insulator cover to penetrate into the area of the neck after the cover is placed over the insulator. Contact with the neck is not needed by the bolt since the bolt creates a suitable reduction in the cover's inner diameter that prevents the cover being lifted or tilted with respect to the insulator. The bolt may be tightened prior to installation of the cover.

In another embodiment, instead of a bolt, a push pin, a flange, a clip, an indentation, or other securing device on one side of the cover may be employed to create a restriction of the cover around the neck of the insulator to prevent rotation.

In one embodiment, the securing device does not restrict the inner diameter of the cover until after the cover is placed over the insulator. As an example, the lineman may screw in the bolt after the cover is placed over the insulator. In such a case, the cover may be installed by placing the cover straight down over the insulator without having to tilt it. Also, the securing device may be resilient (e.g., a resilient flange) and allow the cover to be installed straight down over the insulator, where the securing device then firmly restricts the inner diameter of the cover after the cover is installed.

In a preferred embodiment of the invention, the insulator cover also includes an arm attachment feature for a conductor cover. As an additional securing feature, the arms include holes that are below the conductor. A push pin is passed through the holes so as to additionally block the arms from being lifted off the conductor. However, such pins may not prevent rotation of the cover system about the conductor and insulator. The previously described security device prevents such rotation.

Other features of the cover system are also described.

BRIEF DESCRIPTION OF THE DRAWINGS

FIG. 3 is a cross-sectional view of an insulator and conductor, where the conductor is seated in a top groove of the insulator to provide a symmetric insulator/conductor configuration.

FIG. 4 is a cross-sectional view of an insulator and conductor, where the conductor is seated in a side neck area of the insulator to provide an asymmetric insulator/conductor configuration.

FIG. 6 is a cross-sectional view of FIG. 5 showing the insulator, the conductor affixed to the neck of the insulator, the cover, the securing device, and additional features.

Elements labeled with the same numerals may be identical or similar.

DETAILED DESCRIPTION

Figure 5:
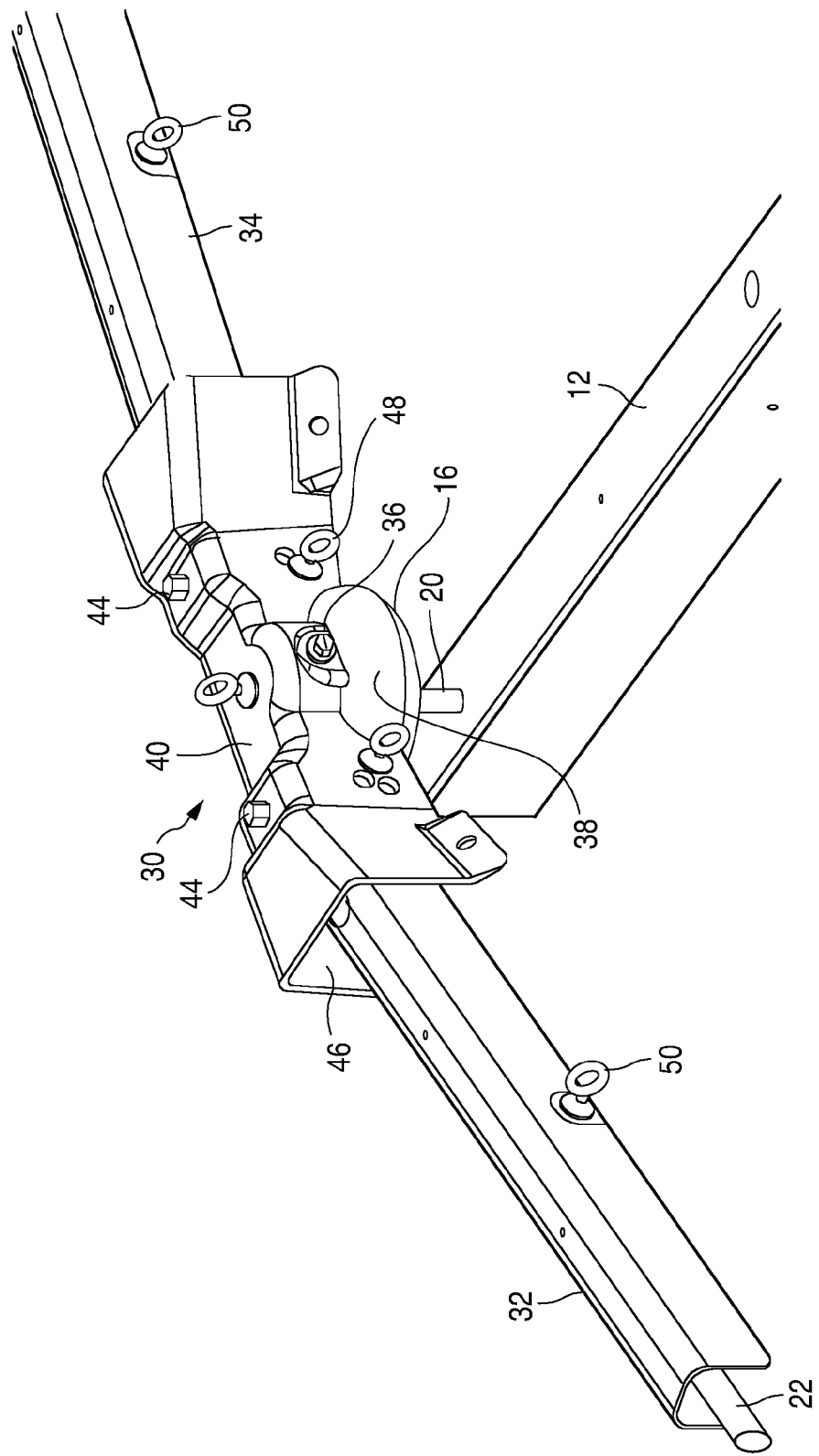
FIG. 5 is a perspective view of an insulator cover and attachable arms, in accordance with one embodiment of the invention, installed over the insulator and conductor of any of FIGS. 1-4, where the securing device is a plastic bolt.

FIG. 5 is a perspective view of an insulator cover 30 and attachable arms 32/34 installed over the insulator 16 and conductor 22 of any of FIGS. 1-4, where the securing device is a plastic bolt 36. All materials may be polymers, such as HDPE, or other type of moldable durable dielectric material.

FIG. 6 is a cross-sectional view of FIG. 5, bisecting the cover 30 along the direction of the crossarm 12.

The insulator cover 30 includes a bottom bell-shaped portion 38, for covering the standard ceramic insulator, and a top portion 40 for covering the top of the insulator 16 and the conductor 22. Note how the cover 30 in FIG. 6 is asymmetrically shaped to include a bulge 41 on one side for accommodating a range of thicknesses of the conductor 22. If the conductor 22 were on the other side of the insulator 16, the cover 30 would be installed in the opposite orientation, so the same cover 30 accommodates the conductor 22 being affixed on either side of the neck or on top of the insulator 16.

A ring 42 attached to the cover 30 allows the cover 30 to be placed over the insulator 16 using a hotstick. The ring 42, shown screwed into the cover 30, may be sufficiently withdrawn if the conductor 22 were seated in the top groove of the insulator 16 for proper orientation of the cover 30. Therefore, the cover 30 fits the same over the insulator 16 whether the conductor 22 is affixed to the top of the insulator 16 or to its neck 26.

Typically, prior to installing the cover 30 over the insulator 16, the arms 32 and 34 are attached to the cover 30 by vertical bolts 44, which pivotally secure the arms 32/34 to the cover 30 via flanges. Each flange may be about one to two inches long, and has a hole at each end. One end is attached to the cover 30 by the bolt 44, and the other end is pivotally attached by a bolt (not shown) to the respective arm 32/34. This allows each arm 32/34 to not only pivot but to be displaced laterally to accommodate the conductor 22 when it is off to one side of the insulator 16, as shown in FIG. 6. On other words, the flange allows the arms 32/34 to be coaxial with the conductor 22 even when the conductor 22 is not centered with respect to the insulator 16. The pivoting of the arms 32/34 also allows the arms 32/34 to accommodate a bend in the conductor 22 around the insulator 16. The cover 30 has flared openings 46 to allow the arms 32/34 to pivot without any stresses on the cover system.

The cover 30 has opposing holes, and each arm 32/34 has opposing holes, that are below the conductor 22. A pin 48 is inserted with a hot-stick or by hand through the two holes in the cover 30. Similar pins 50 are used for the arms 32/34. The pin 48 has a ring 52 (FIG. 6) at one end for the hot-stick and a resilient, expandable tip 54 at the other end. When the pin 48 is pushed through the holes, the tip 54, being narrow at its end and tapered, compresses to easily pass through the holes. The tip 54 has a greater than 60 degree angle rim portion that makes it more difficult to remove. Therefore, the pin 48 remains held in place. The pins 48 and 50 are under the conductor 22 to prevent the cover 30 and arms 32/34 from being lifted off the insulator 16 and conductor 22 by wind.

To prevent the cover 30 and arms 32/34 from rotating with respect to the insulator 16 during high winds, a securing device reduces the inner diameter of the cover 30 in the area of the neck of the insulator 16. In the example shown in FIG. 6, the securing device is a threaded plastic bolt 56 that screws into a hole in the cover 30 at the area of the neck. The bolt 56 may have an enlarged head or other shape to enable the bolt 56 to be screwed in without tools. The bolt 56 remains frictionally in place and does not need to be tightly screwed in against the neck, since any restriction of the cover 30 less than the diameter above the neck prevents the cover 30 from rotating during a high wind.

Importantly, the securing device must be designed to allow the cover 30 to be easily placed over the insulator 16 yet perform the restriction function after the cover 30 has been placed over the insulator 16. Other suitable securing devices may include a pin, similar to pin 48, that the lineman inserts through the hole in the cover 30 with a hotstick to enter the neck area. Other securing devices may include, but are not limited to, a flange, a clip, an inner bulge in the cover, or an indentation in the cover 30. Any securing device that is rigid and installed in the cover prior to the cover being installed creates an asymmetrical restriction of the inner diameter of the cover, so the cover can be installed by first tilting the cover to insert the securing device into the neck of the insulator, then straightening out the cover, which further inserts the securing device into the neck area of the insulator.

If the securing device is resilient, the cover may be installed straight over the insulator, and the securing device may be located at more than one place on the cover. Any resilient feature would be shaped to allow a low force compression when the cover is put in place and a high force compression to block the cover being lifted in the upward direction. However, a rigid securing device is preferable to ensure that the cover 30 cannot be rotated with the highest foreseeable winds.

In the example of FIG. 6, since the conductor 22 is off-centered, the pin 48 under the conductor 22 blocks the cover 30 being rotated in the clockwise direction. For a wind coming from the right side, the cover 30 is being forced to rotate around the conductor 22 or the skirt of the insulator 16 acting as a fulcrum. The bolt 56 blocks that counter-clockwise rotation.

If the conductor 22 were seated in the top groove of the insulator 16, additional holes in the cover 30 can be provided higher up so the pins 48 can be closer to the bottom of the conductor 22. In such a case, there is less problem with rotation since the cover 30 is symmetrically prevented from rotation by the lower sides of the cover 30 contacting the insulator 16. However, the bolt 56 may still aide somewhat in blocking rotation.

Figure 1:
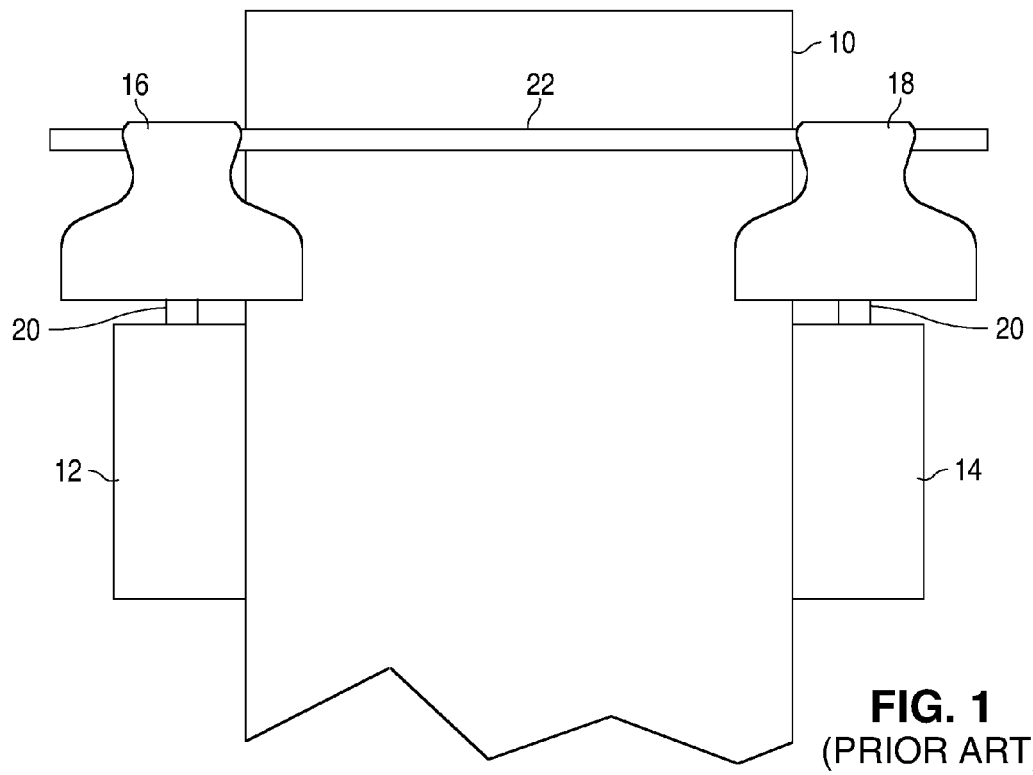
FIG. 1 is a side view of the top section of a wooden utility pole having crossarms, where ceramic insulators are supported on the crossarms for supporting a conductor.
Figure 2:
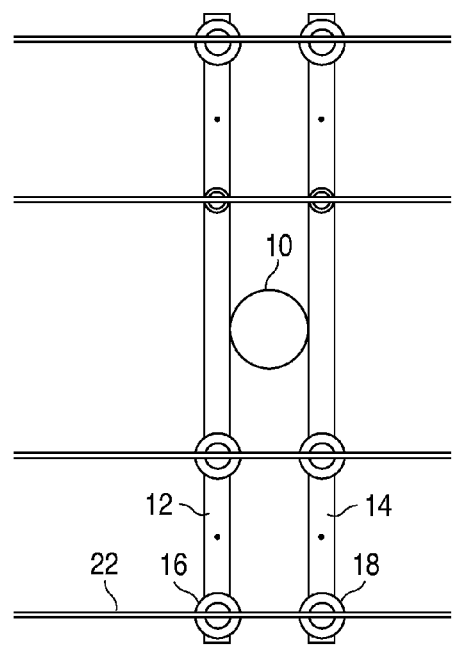
FIG. 2 is a top down view of the pole of FIG. 1.

FIG. 6 also shows an optional sleeve 60 (not needed in the example of FIG. 5) that would be used if a pair of insulators on a pole supported a single conductor 22, as shown in FIGS. 1 and 2. The sleeve 60 covers the conductor 22 between the two insulators 16/18. The sleeve 60 is also shown in FIG. 8.

Figure 7:
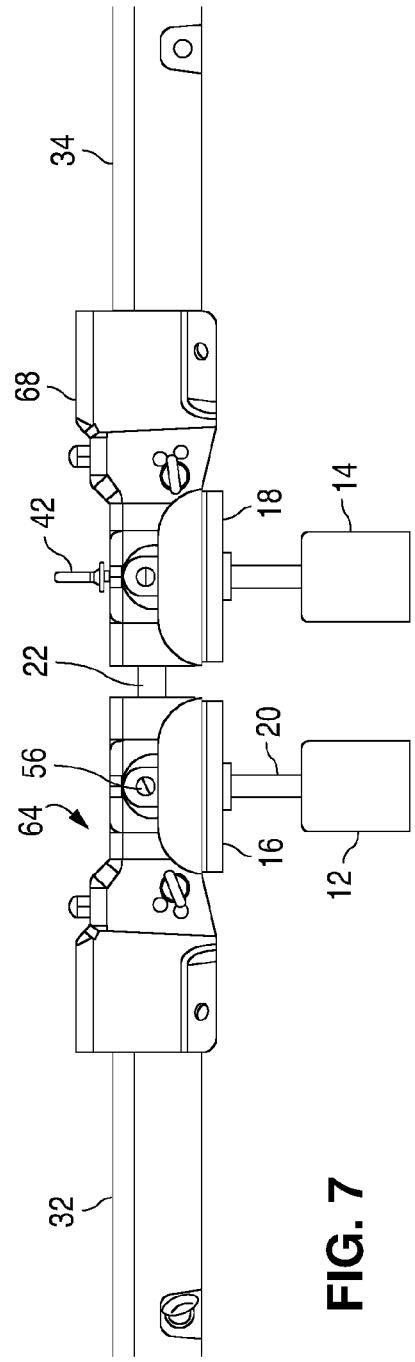
FIG. 7 is a side view of two insulator covers covering insulators on the same pole supporting the same conductor.

FIG. 7 illustrates an insulator cover 64 similar to the cover 30 but there is a provision for attachment to only one conductor cover arm 32, since the insulators 16 and 18 are closely spaced by, for example, 5-22 inches on the same pole and the distance between the insulators 16 and 18 is variable, depending on the thickness of the pole. The cover 64 is otherwise identical to the cover 30, with the bolt 56 performing as the securing device to prevent rotation of the cover 64 and arm 32. The cover 68 is the mirror image of the cover 64.

In FIG. 7, there is a variable length of the conductor 22 that is exposed between the insulator covers 64 and 68, and that portion needs to be covered.

Figure 8:
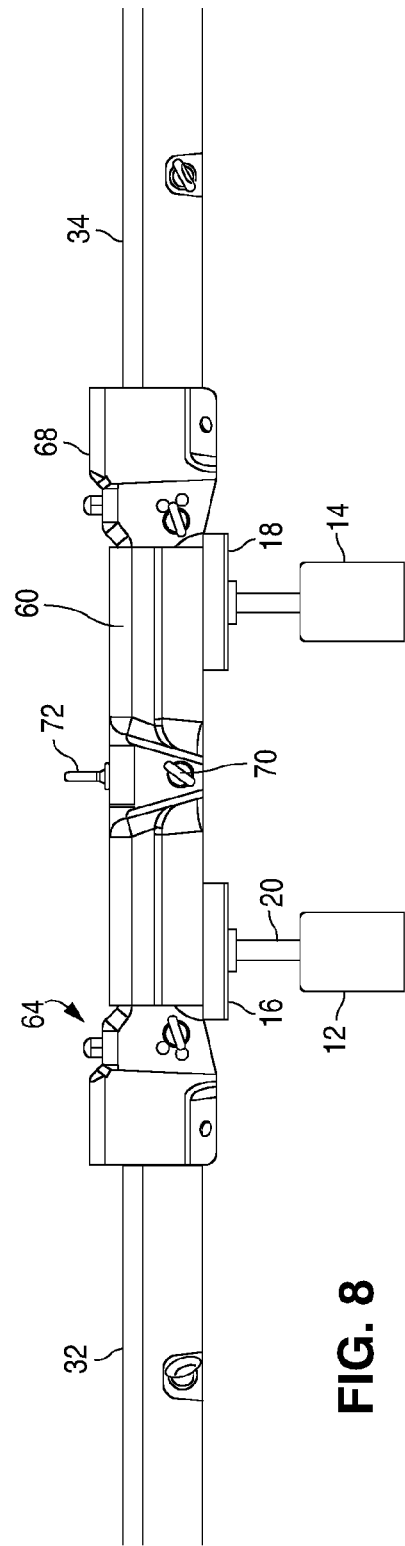
FIG. 8 is a side view showing a sleeve over insulator covers and over a conductor extending between the insulator covers.

FIG. 8 illustrates how the sleeve 60 simply fits over the top of the covers 64 and 68 and over the conductor 22. The overlap of the sleeve 60 with the covers 64/68 is variable, depending on the gap between the covers 64/68. In that way, the same sleeve 60 may be used with a wide range of gaps between the covers 64/68. For example, the insulators 16/18 in FIGS. 7 and 8 are separated by different distances, yet the same sleeve 60 may be used for either distance to cover the conductor 22. The sleeve 60 may be, for example, 18 inches long to cover a variable gap between 10 and 16 inches. The sleeve 60 is blocked from coming off the conductor 22 by a pin 70 inserted through holes below the conductor 22. The pin 70 may be similar to the pin 48 in FIG. 6. A ring 72 allows the sleeve 60 to be installed using a hotstick.

There are a variety of insulator shapes, and the insulators 16/18 are just examples. Other insulators are longer with sides having multiple ridges for higher voltages, and other insulators are simpler. An insulator having multiple ridges has multiple necks, and the securing device may restrict the cover's inner diameter at any of the neck areas.

The insulator covers of the present invention may be molded to accommodate any standard insulator shape while still retaining all aspects of the invention. Such insulator covers would contain some securing device, such as the bolt 56, that reduces the inner diameter at some area of the cover, depending on the shape of the insulator, to engage a feature (e.g., a ridge neck) of the insulator to prevent the cover from rotating with respect to the insulator.

Instead of the insulator having a conventional reduced diameter neck area(s), the insulator may have any feature, including a single flange, that creates a reduced diameter of the insulator (e.g., below the flange) at a certain point along its length. A cover specifically for that type of insulator may then be designed with a securing device, such as the bolt 56, that restricts the diameter of the cover at the location of the reduced diameter of the insulator to prevent lifting and rotation of the cover.

In a preferred embodiment, the molded cover is semi-rigid (e.g., at least 1/8 inch thick plastic) so as to retain its shape during high winds. Otherwise, distortion of the cover when stressed during a very high wind may sufficiently expand the diameter of the cover at its restricted diameter area and cause rotation or a lifting of the cover.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A system comprising:
   an insulator supporting a conductor running substantially perpendicular to the insulator, the conductor being for carrying a voltage, the insulator being supported by a support structure, the insulator comprising a dielectric top portion having a first diameter, a dielectric neck portion below the top portion and having a second diameter less than the first diameter, and a dielectric lower portion below the neck portion and having a third diameter greater than the first diameter;
   a dielectric cover for the insulator comprising:
   a dielectric material fitted over the insulator to cover at least the top portion of the insulator, all of the neck portion of the insulator, and the conductor portion in contact with the insulator;
   openings on opposite sides of the cover for the conductor to extend through, which allows the cover to be placed over the conductor and insulator, and removed from over the conductor and insulator, without removing the conductor from the insulator; and
   a securing device on the cover that allows the cover to be placed over the insulator and restricts an inner diameter of the cover at the neck portion of the insulator to be less than the first diameter, wherein the securing device blocks the cover from being rotated about the insulator due to the securing device restricting the inner diameter of the cover at the neck portion of the insulator.

2. The system of claim 1 wherein the cover comprises a semi-rigid plastic that does not distort when the cover is fitted over the insulator.

3. The system of claim 1 wherein the securing device is located so as to be inserted toward the neck portion of the insulator when the cover is placed over the insulator.

4. The system of claim 1 wherein the securing device comprises a rigid indent in the cover.

5. The system of claim 1 wherein the securing device is a threaded bolt that is screwed into a hole in the cover.

6. The system of claim 1 wherein the securing device comprises a resilient feature in the cover.

7. The system of claim 1 wherein the securing device comprises one of an inner bulge in the cover and an indentation in the cover.

8. The system of claim 1 wherein the securing device engages neck portion of the insulator.

9. The system of claim 1 wherein the conductor is supported by a top of the insulator.

10. The system of claim 1 wherein the conductor is supported by a side of the insulator.

11. The system of claim 10 wherein the cover is shaped to have a bulge to accommodate an increased diameter where the conductor is supported by the side of the insulator.

12. The system of claim 10 wherein the securing device is located on a side of the cover opposite the side where the conductor is supported by the side of the insulator.

13. The system of claim 1 further comprising at least one arm attached to the cover to shield the conductor extending from the cover.

14. The system of claim 1 wherein the insulator and the cover are bell shaped.

15. The system of claim 1 wherein the securing device is asymmetrically located on the cover.

16. The system of claim 1 wherein the support structure is a utility pole.

\* \* \* \* \*